United States Patent [19]

Young et al.

[11] Patent Number: 4,475,879
[45] Date of Patent: Oct. 9, 1984

[54] TIRE REPAIR APPARATUS

[76] Inventors: Lauren D. Young, 62 N. River Dr.; Robert S. Cameron, 1547 NW Rachel, both of Roseburg, Oreg. 97470

[21] Appl. No.: 453,615

[22] Filed: Dec. 27, 1982

[51] Int. Cl.³ .......................... B29H 5/04; B29H 5/16
[52] U.S. Cl. ......................................... 425/22; 425/23
[58] Field of Search ....................... 425/15, 16, 17, 19, 425/20, 21, 22, 23, 24, 25, 26, 27, 44

[56] References Cited

U.S. PATENT DOCUMENTS

| | | | |
|---|---|---|---|
| 1,932,692 | 10/1933 | Fetter | 18/17 |
| 2,004,800 | 6/1935 | Rogers | 425/22 |
| 2,319,447 | 5/1943 | Drennan | 425/22 |
| 2,391,300 | 12/1945 | Dettling | 18/18 |
| 2,445,054 | 7/1948 | Baker | 425/17 |
| 2,743,481 | 5/1956 | Hawkinson | 425/22 |
| 3,113,902 | 12/1963 | Dismuke | 425/44 X |
| 3,310,838 | 3/1967 | Sornsen | |
| 3,324,506 | 6/1967 | Rifchin | 425/23 |
| 3,940,463 | 2/1976 | Nicholson | 264/36 |
| 4,011,125 | 3/1977 | Pelletier | 156/394 |

Primary Examiner—Jan Silbaugh
Attorney, Agent, or Firm—James D. Givnan, Jr.

[57] ABSTRACT

A tire table is disclosed for supporting a pneumatic tire during recapping of same. A structure defining an annular steam chamber is removably positionable on the tire table so as to apply heat to an extensive area or areas of a tire sidewall during the repair of same. A circular plate structure of the tire table is equipped with a steam receptacle for applying heat to localized areas of the sidewall being repaired. A rim assembly is engageable with the damaged beads of a tire being recapped and includes annular wall structures for the flow of steam for heating the tire bead or beads during repair of same. A tire recapping mold of conventional design is also disclosed.

3 Claims, 5 Drawing Figures

U.S. Patent  Oct. 9, 1984  4,475,879
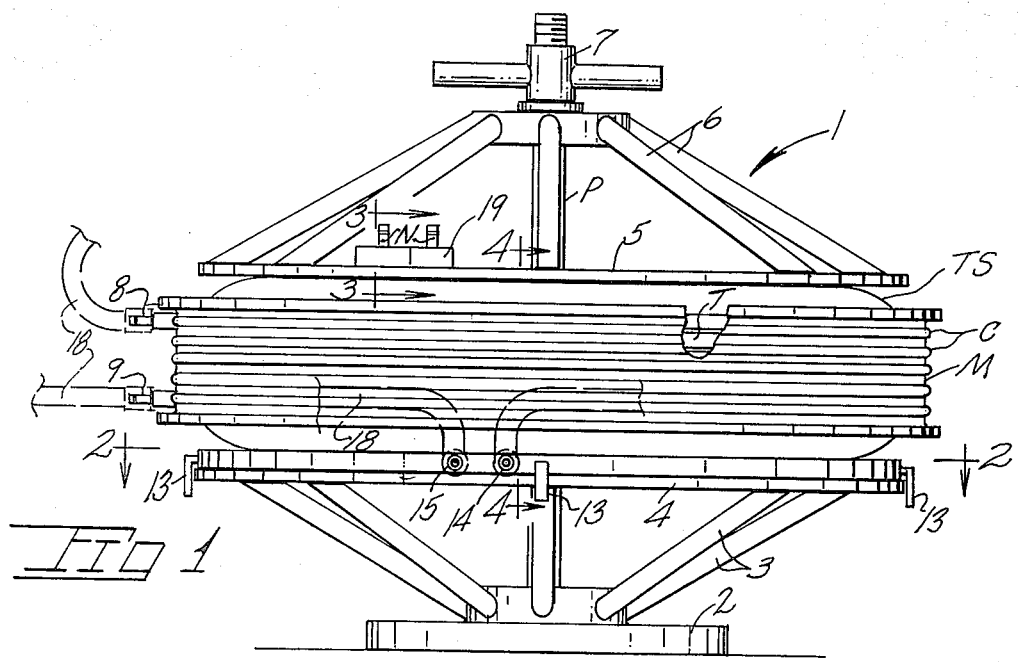
Fig. 1
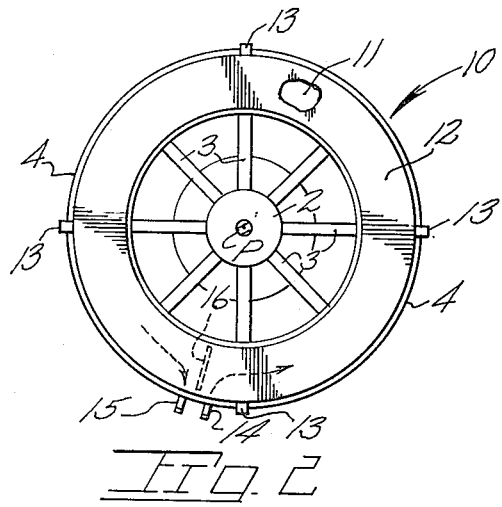
Fig. 2
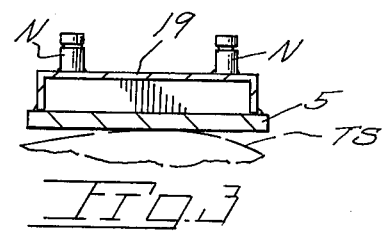
Fig. 3
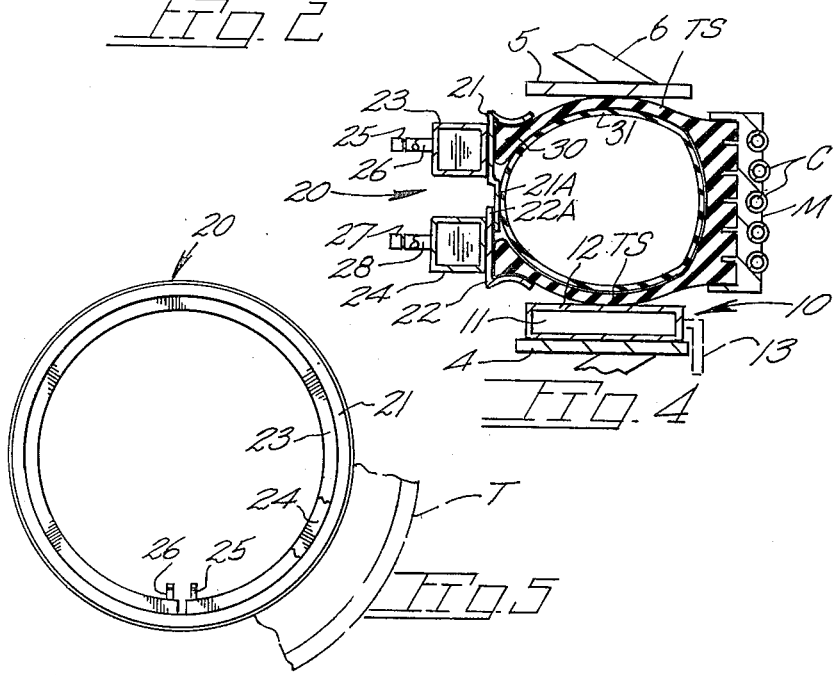
Fig. 4
Fig. 5

TIRE REPAIR APPARATUS

BACKGROUND OF THE INVENTION

The present invention pertains generally to an apparatus for repairing the sidewall and bead portions of a tire while the tire is being provided with a new tread band.

Conventional tire recapping operations include the providing of the buffed tire body with a band of tread rubber, with the tire body and band being subjected to heat imparted by a mold circumposed about the tread band. The retreading operation is commonly performed on a tire table whereat the tire sidewalls are each in abutment with circular tire table surfaces. Typically with existing equipment, sidewall repairs must be done prior to the recapping operation at a separate location within the tire repair facility. Similarly, if repair of a tire bead is necessary, the same is usually done separately and before or after recapping of the tire. Accordingly, considerable effort and time are expended in the setting up of a tire in a bead or sidewall repair apparatus whereafter (or before) the tire must then be installed on a tire table whereat the recapping operation is accomplished in the usual manner. As tires are heated during both the repair and recapping the same are not conveniently handled until after a lengthy cool down period has elapsed subsequent to mold removal. Known tire sidewall repair equipment does not lend itself to the repair of sizable segments of a sidewall while like repairs are being made to the remaining sidewall or to one or both beads of the tire.

In the mounting and removal of pneumatic tires from their wheels it is not uncommon that pieces of rubber will be dislodged from the tire bead to render the tire unsuitable for further use. Repairs to the bead can be made but are often impractical from a cost standpoint as the repair heretofore entailed a separate tire handling operation. Similarly, the repair of a tire sidewall may dictate discarding of the tire as such repair would entail separate and preliminary tire repair operations.

U.S. Pat. No. 3,113,902 discloses a tire table structure having a circular heated chamber secured to a table surface for the application of an ornamental strip to a tire sidewall. U.S. Pat. No. 1,932,692 discloses a tire vulcanizing apparatus wherein a circular steam chamber applies heat to the inside surfaces of tire beads during tire manufacture with additional steam chambers for heating remaining tire portions. U.S. Pat. No. 4,011,125 discloses a tire retreading apparatus wherein a bladder within the tire is pressurized by steam to heat the tire during a recapping operation. U.S. Pat. No. 3,940,463 discloses a tire repair system for curing a damaged segment of a pneumatic tire wherein heated pads are biased by air bags into contact with tire tread and sidewall portions. U.S. Pat. No. 2,391,300 discloses an apparatus for the simultaneous application of heat to damaged tread and sidewall portions of a pneumatic tire. U.S. Pat. No. 3,038,204 discloses a machine with a heated mandrel applying heat to the inner surfaces of tire sidewalls. U.S. Pat. No. 1,498,998 discloses a segmental tire repair machine for the application of heat to the surfaces of tire sidewall and tread segments.

SUMMARY OF THE PRESENT INVENTION

The present invention is embodied within an apparatus for selectively heating portions of a tire body for repair purposes while a recapping mold is in place about the tire body.

The present apparatus includes the provision of a sidewall repair plate and a bead repair rim which may be used singly or jointly on a tire to which a tread band is being applied to significantly reduce the time spent in refurbishing a used tire.

An annular structure defines a circular steam chamber which corresponds in magnitude to the tire sidewall to encompass widely spaced apart or sizeable repair areas. Said annular structure is detachably mounted on a tire table plate to permit its selective use in place above or below a tire sidewall or may be used in paired fashion on both sidewalls.

A steam receptacle is fixedly mounted on the apparatus for the heating of a small sidewall area for the localized repair of punctures or tears therein.

Important objectives of the present apparatus include the provision of an apparatus which greatly reduces the time and handling of a tire being recapped which requires repair of a sidewall or bead; the provision of an apparatus which is highly adaptable to the repair of either sidewall or bead or both of same simultaneously with the molding of a new tread band to the tire; the provision of an apparatus including an annular structure having a steam chamber which structure is usable above or below a tire in place on a tire table which table includes a permanent steam receptacle for localized sidewall repairs; the provision of a rim structure engageable with the beads of a tire to apply heat to one or both of said beads.

BRIEF DESCRIPTION OF THE DRAWING

In the accompanying drawing:

FIG. 1 is a side elevational view of the present apparatus;

FIG. 2 is a horizontal sectional view taken downwardly along line 2—2 of FIG. 1;

FIG. 3 is a vertical sectional view taken along line 3—3 of FIG. 1;

FIG. 4 is a vertical sectional view taken along line 4—4 of FIG. 1; and

FIG. 5 is a plan view of a chamber defining rim structure for the application of heat to tire beads.

DETAILED DESCRIPTION OF THE PREFERRED EMBODIMENT

With continuing attention to the drawing wherein applied reference numerals indicate parts similarly hereinafter identified, the reference numeral 1 indicates generally, what is termed in the tire recapping industry, a tire table used for tire confinement during a recapping operation.

Typically known tire tables generically include a base 2 having supports 3 which terminate upwardly in securement to a lower annular plate 4 on which a tire T may rest. A removable upper annular plate at 5 is retained in place by supports 6 and a threaded locking sleeve 7. Application of heat is by means of a steam heated tread mold M to a newly applied tread band. The used tire has previously been prepared by buffing of the tire tread area and the application of a cementing agent. Mold M may be of conventional design and heated by the routing of steam through a continuous mold conduit C extending thereabout and served by inlet and outlet nipples at 8 and 9.

In FIGS. 2 and 4, I show details of an annular structure generally at 10 defining a circular steam chamber 11 for the application of heat via a chamber wall 12 to a tire sidewall TS in those instances where sidewall damage is other than of a localized nature. Registration means shown as fingers at 13 center the structure in place on its adjacent lower or upper tire table plate. Inlet and outlet means at 14 and 15 provide for a steam flow through its chamber which is partitioned at 16. Structure 10 may be used independently or in conjunction with a steam receptacle 19 in place on upper annular plate 5 and having inlet and outlet nipples at N. In the event of multiple or extensive repairs on both tire sidewalls the same may be heated in their entirety by the use of a pair of upper and lower annular structures one each adjacent a tire table plate.

The steam receiving areas of annular structure 10, tire mold M and steam receptacle 19 may be served by steam conduits as at 18 to direct a sequential flow of steam through the various chambers.

As best viewed in FIGS. 4 and 5, a rim assembly generally at 20 attaches to the tire beads and includes bead engaging rim members at 21 and 22 in mutual adjustable engagement at lapped segments at 21A–22A. Affixed to each circular rim member 21-22, as by welds at points therealong, are upper and lower steam receiving rings at 23 and 24 which extend substantially about the entire inner periphery of their respective rim members. Steam ring 23 is fitted with inlet and outlet nipples 25 and 26 while remaining steam ring 24 has inlet and outlet nipples 27 and 28. Rubber pieces accidentally removed from the tire inner periphery of the tire beads at 30 during tire mounting or removal from a wheel may accordingly be replaced.

An inflatable tube 31 serves to hold the tire sidewall against the upper and lower plates of the table during the tire recapping and repair operation.

While we have shown but one embodiment of the invention it will be apparent to those skilled in the art that the invention may be embodied still otherwise without departing from the spirit and scope of the invention.

Having thus described the invention, what is desired to be secured under a Letters Patent is:

1. An apparatus for simultaneously repairing sidewall and bead portions of an inflated tire during the molding of a tread band to the tire, said apparatus including,
   upper and lower annular plate members adapted to be fixedly positioned adjacent the sidewall of a tire,
   means confining said members against opening axial movement,
   an annular structure defining a steam chamber said annular structure corresponding generally in diameter to said plate members, steam inlet and outlet means in communication with said steam chamber,
   registration means retaining said annular structure in coaxial detachable registration with one of said annular plate members so as to be interposed between said one annular plate member and a tire sidewall for the application of heat to same in a combined sidewall repair and tread molding operation, and
   a rim assembly including a pair of bead engaging circular rim members which may be secured to and supported by the beads of the tire, said rim members each having a steam receiving ring on its inner periphery defining a chamber for the reception of steam for application of heat to the inner periphery of one or both tire beads for the repair thereof, each steam receiving ring having inlet and outlet means thereon for the reception of steam conduits for the heating of one or both tire beads.

2. The apparatus claimed in claim 1 wherein one of said annular plate members includes a receptacle having inlet and outlet means thereon for the reception of steam for the heating of a localized segment of a tire sidewall being repaired.

3. The apparatus claimed in claim 1 wherein said rim members each include circular lapped segments in mutual sliding adjustable engagement whereby the rim members may be positioned in an axially manner to receive differently spaced apart tire beads throughout a range of tire sizes.

* * * * *